United States Patent
Buschatz

(10) Patent No.: US 6,460,335 B1
(45) Date of Patent: Oct. 8, 2002

(54) ACTUATOR

(75) Inventor: Immanuel Buschatz, Unterensingen (DE)

(73) Assignee: Behr Thermot-tronik GmbH & Co., Kornwestheim (DE)

( * ) Notice: Subject to any disclaimer, the term of this patent is extended or adjusted under 35 U.S.C. 154(b) by 36 days.

(21) Appl. No.: 09/714,588

(22) Filed: Nov. 16, 2000

(30) Foreign Application Priority Data

Nov. 16, 1999 (DE) .......................................... 199 54 916

(51) Int. Cl.$^7$ .............................. F01B 29/10; H02P 1/00
(52) U.S. Cl. ...................... 60/527; 236/78 D; 251/11; 318/652
(58) Field of Search ............................. 251/129.04, 11; 318/652; 236/78 D, 78 C, 68 C, 68 R; 60/527

(56) References Cited

U.S. PATENT DOCUMENTS 4,078,721 A * 3/1978 Okuhara ................... 236/78 C
5,897,055 A * 4/1999 Saur et al. ................... 337/393
6,247,678 B1 * 6/2001 Hines et al. ................... 251/11

FOREIGN PATENT DOCUMENTS

DE          41 38 523 A1      5/1993

* cited by examiner

Primary Examiner—William Wayner
(74) Attorney, Agent, or Firm—Kennedy Covington Lobdell & Hickman, LLP

(57) ABSTRACT

An actuator for a device such as a tappet of a valve. The actuator having a thermostatic operating element electrically heated by an electrical heating element, and including an operating piston. A proportional piston stroke regulator detects and controls the position of the operating piston. The proportional piston stroke regulator includes a piston travel detection device, that detects the actual position of the operating piston, connected to a conventional closed-loop controller which compares the measured piston position to a predetermined piston control position entered into the closed-loop controller. Based on the comparison, the closed-loop controller regulates the electrical supply to the electrical heating element.

4 Claims, 2 Drawing Sheets

ACTUATOR

FIELD OF THE INVENTION

The invention relates to an actuator with an electrically heatable thermostatic operating element heated by an electrical heating element and having a housing containing an expanding material and an operating piston that is extensible from the housing, the piston position being controlled by a proportional piston stroke regulator.

BACKGROUND OF THE INVENTION

An actuator of this type is known, for example, in German Patent Disclosure DE 41 38 523 A1. In that construction, the regulation of the position of the operating piston is based on the electrical resistance of the thermostatic operating element, which is assumed to vary as a function of the change in volume of the expanding material, so that the electrical resistance of the operating element corresponds to the position of the operating piston. This design is not totally reliable as changes in ambient temperatures, ambient pressures or combinations thereof potentially change the expansion for a given temperature as measured by the operating piston position since the electrical resistance measured is not truly proportional to the actual temperature. Furthermore, the starting ambient temperature surrounding the operating element would either have to be a constant, so the piston always started at the same position with the same corresponding measured electrical resistance, or the piston position would have to be re-calibrated before every use of the operating element. The operability of the exemplary embodiments with which an electrical resistance varying with the change in volume of the expanding material is to be detected is not always consistent with precise and accurate movement and regulation of the operating piston.

OBJECT AND SUMMARY OF THE INVENTION

It is the object of the present invention to provide an actuator with a way of precisely measuring and regulating the position of the operating piston.

This object is attained by controlling the operating piston position with a proportional piston stroke regulator, which includes a piston travel detection device connected to a conventional closed-loop control circuit. The closed-loop control circuit compares the detected position of the operating piston with an entered pre-determined piston control position and regulates the electrical current supply to the electrical heating element accordingly.

By the present invention, it is possible to provide very precise measurement and regulation of the operating piston position. In particular, very precise movement of the operating piston to pre-determined positions is possible.

In a specific embodiment of the invention, the conventional closed-loop control circuit controls the supply of pulses of alternating current to the electrical heating element by the use of a relay, in particular a triac. By supplying the electrical heating element with an adjustable intermittent duration of pulses of electrical current, the electrically heatable thermostatic operating element behaves in the manner consistent with a proportional, integral, derivative (PID) controller, enabling very precise piston position regulation. Precision is enhanced if the operating temperature of the expanding material, that is, the temperature at which the expanding material begins to change from its original unheated state, is markedly above the ambient temperature, so that relatively rapid cooling and retraction of the operating piston occurs when the electrical heating element is not supplied with electrical current.

In another specific embodiment of the invention, the maximum travel of an actuator element of a device to be actuated is determined and stored in the memory of the conventional closed-loop control circuit. It is thus possible within the closed-loop control circuit to detect the maximum travel of the device to be actuated, for example a tappet of a valve, and to evenly distribute the pre-determined piston control positions along the entire length of travel, for example between the opening position and the closing position of a tappet of a valve, thereby providing a number of adjustable positions available to the actuating element of the device to be actuated.

In a specific structural embodiment of the invention, an outer housing encloses a stationary base body on which the electrically heatable thermostatic operating element, a motion transfer member moveable with the operating piston and the piston travel detection device are supported, the piston travel detection device being disposed between the motion transfer member and the outer housing or the base body. A preferred construction of the piston travel detection device includes a stationary element, mounted on the outer housing or the stationary base body, and a relative position element associated with the stationary element and moveable with the motion transfer device and the operating piston.

In a specific feature of the structural embodiment of the invention, the relative position element moveable with the motion transfer device and the operating piston is disposed on a circuit board which is mounted on the motion transfer member. It is advantageous if the conventional closed-loop control circuit and the relay are disposed on the circuit board as well.

Further characteristics and advantages of the invention will become apparent from the following description of the exemplary embodiment shown in the drawing.

DESCRIPTION OF THE PREFERRED EMBODIMENT

Figure 1:
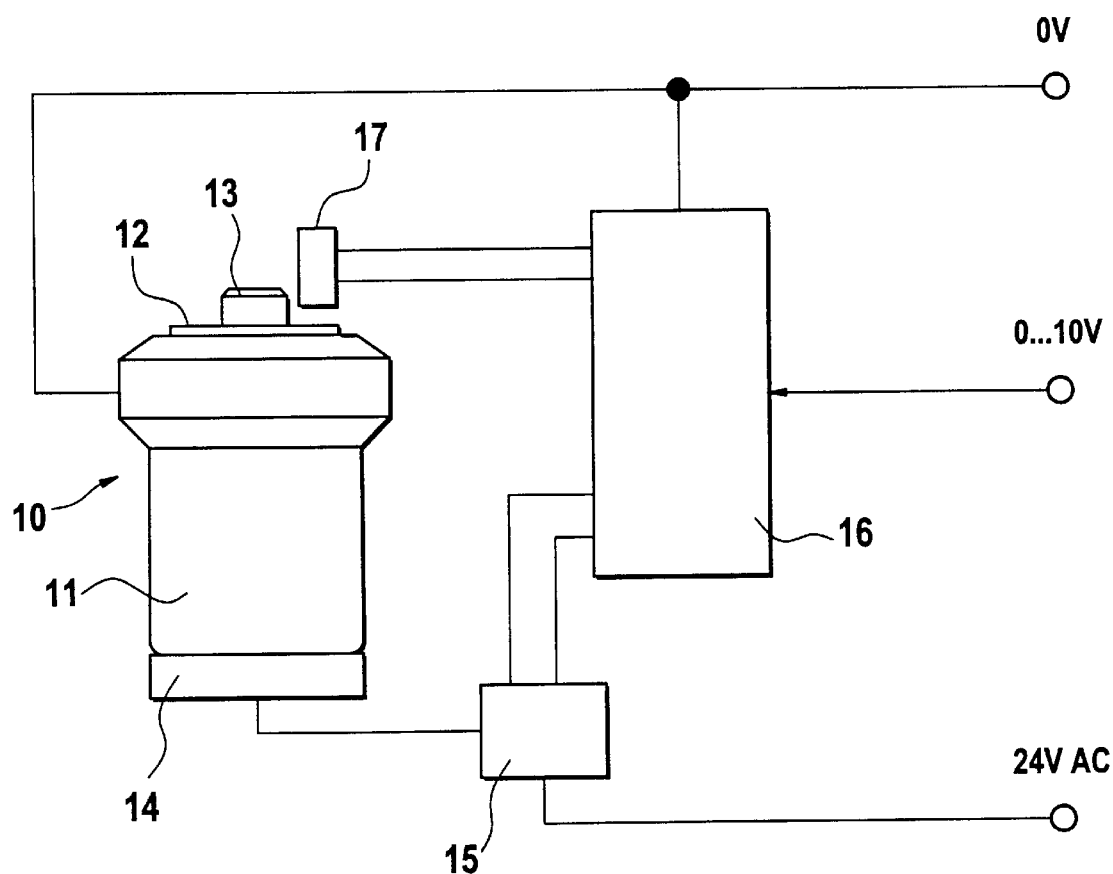
FIG. 1 is a schematic view of an actuator of the present invention.

The actuator shown in FIG. 1 includes an electrically heatable thermostatic operating element 10 having a metal housing 11 containing an expanding material, in particular a wax mixture, and a guide insert 12 secured to one end of the housing 11 through which an operating piston 13 extends outwardly from the housing. A flexible diaphragm internal to the housing 11 and sealingly attached to the upper edge of the housing 11 by the guide insert 12, surrounds the operating piston 13, isolating the operating piston 13 from the expanding material contained in the housing 11.

An electrical heating element 14, such as a positive temperature coefficient (PTC) resistor, is located under the housing 11 of thermostatic operating element 10. The electrical heating element 14 is connected to an electrical current source in the manner disclosed in U.S. Pat. No. 5,897,055

(German Patent Disclosure DE 197 05 721 A1). The electrical heating element 14 heats the thermostatic operating element 10 such that the expanding material increases its volume, thus in accordance with its increase in volume driving the operating piston 13 out of the housing 11 through the guide insert 12. The operating temperature of the expanding material, in particular the temperature at which it changes from its unheated state, is defined as sufficiently high compared with the ambient temperature that rapid cooling occurs after the electrical current is removed from the electrical heating element 14. For example, if the thermostatic operating element 10 is used in an area with the ambient temperature being room temperature (approximately 22° C.), then an operating temperature of 70.4° C. may be desired for the expanding material.

The electrical heating element 14 is connected to a 24 V alternating current electrical source by an electrical supply line. A relay 15, particularly a conventional triac, is integrated into the electrical supply line, enabling the electrical heating element 14 to be supplied with electrical power in pulses of adjustable intermittent duration.

The relay 15 is operated by a conventional closed-loop controller 16, which forms a closed-loop control circuit. Also connected to the closed-loop controller 16 is a piston travel detection device 17 moveable with the operating piston 13. The piston travel detection device 17 transmits a signal to the closed-loop controller 16 corresponding to the detected position of the operating piston 13. The detected position of the operating piston 13 is compared by the closed-loop controller 16 to a pre-determined piston control position entered into the closed-loop controller 16. Any deviation between the detected position and the predetermined piston control position causes the closed-loop controller 16 to operate the relay 15 in such a way that pulses of electrical current are intermittently sent to or blocked from the electrical heating element 14, sequentially energizing and de-energizing the electrical heating element 14.

The pre-determined piston control positions for the operating piston 13 are entered into the conventional closed-loop controller 16 as direct voltage values in a range between 0 V and 10 V. These direct voltage values are coordinated within the closed-loop controller 16 with the detected travel distance of the operating piston 13, with the 10 V direct voltage value corresponding to the maximum travel of the operating piston 13 and the remaining predetermined piston control positions evenly distributed along the entire travel length of the operating piston 13. This coordination of the direct voltage values and the travel of the operating piston 13 within the closed-loop controller 16 is achieved in the following manner.

The conventional closed-loop controller 16 causes the electrical heating element 14 to be energized for a sufficient amount of time such that the expanding material of the thermostatic operating element 10 increases in volume, causing the operating piston 13 to engage and move the actuating element of the device to be actuated to its maximum point. For example, if the device to be actuated is a valve and the outward motion of the operating piston 13 acts to close the valve, then the travel of the valve and the operating piston 13 would be from the valve's open position to its closed position. On the other hand, if the device to be actuated is a valve tappet such that the outward motion of the operating piston 13 acts to open the valve tappet, then the travel of the device and the operating piston would be from the device's closed position to its open position. The maximum travel distance required of the operating piston 13 is registered when the actuating element of the device to be actuated reaches its maximum travel, and the corresponding maximum pre-determined piston control position is entered in the closed-loop controller 16. The closed-loop controller 16 then causes the electrical heating element 14 to be de-energized, allowing the expanding material of the thermostatic operating element 10 to cool to ambient temperature, thereby decreasing in volume. The operating piston 13 is then forced back into the housing 11 by a compression spring, not shown in FIG. 1. As the operating piston 13 withdraws into the housing 11, the actuating element of the device to be actuated follows the operating piston 13 until the minimum position for the actuating element (open or closed) is reached. Thus the minimum distance required of the operating piston 13 is determined and the corresponding minimum pre-determined piston control position is entered in the closed-loop controller 16. The remaining pre-determined piston control position direct voltages are distributed evenly along the travel length of the operating piston 13. For example, if the maximum travel distance of the operating piston 13 was determined to be 2.5 mm and the minimum travel distance was 0 mm, then the maximum pre-determined control position entered would correspond to 2.5 mm, the minimum pre-determined control position entered would correspond to 0 mm, and the remaining pre-determined control positions would be entered to correspond to a travel distance of 0.25 mm for each voltage step (i.e., each 1 V is 0.25 mm). The maximum travel of the actuating element of the device to be actuated can be readjusted with little difficulty, making the actuator adaptable to any variations in the maximum travel distance of the actuating element. The pre-determined control positions for the operating piston 13 can be determined the first time electrical power is supplied to the electrical heating element 14 and readjusted after every power supply disruption.

The piston travel detection device 17 can operate by a variety of conventional methods, including, but not limited to, the following: utilizing the Hall effect by using a magnetic field sensor; using the change in capacitance of a capacitor; by magnetoresistivity; as a system employing the Wiegand effect; and by an optical method using applied, detectable markings. The preferred method of the present invention employs a two-piece apparatus—a ferrite bar that penetrates into a electromagnetic coil to which an electrical voltage has been supplied. The distance in which the bar penetrates the coil creates a detectable change in inductance, corresponding to the change in the position of the operating piston 13.

Figure 2:
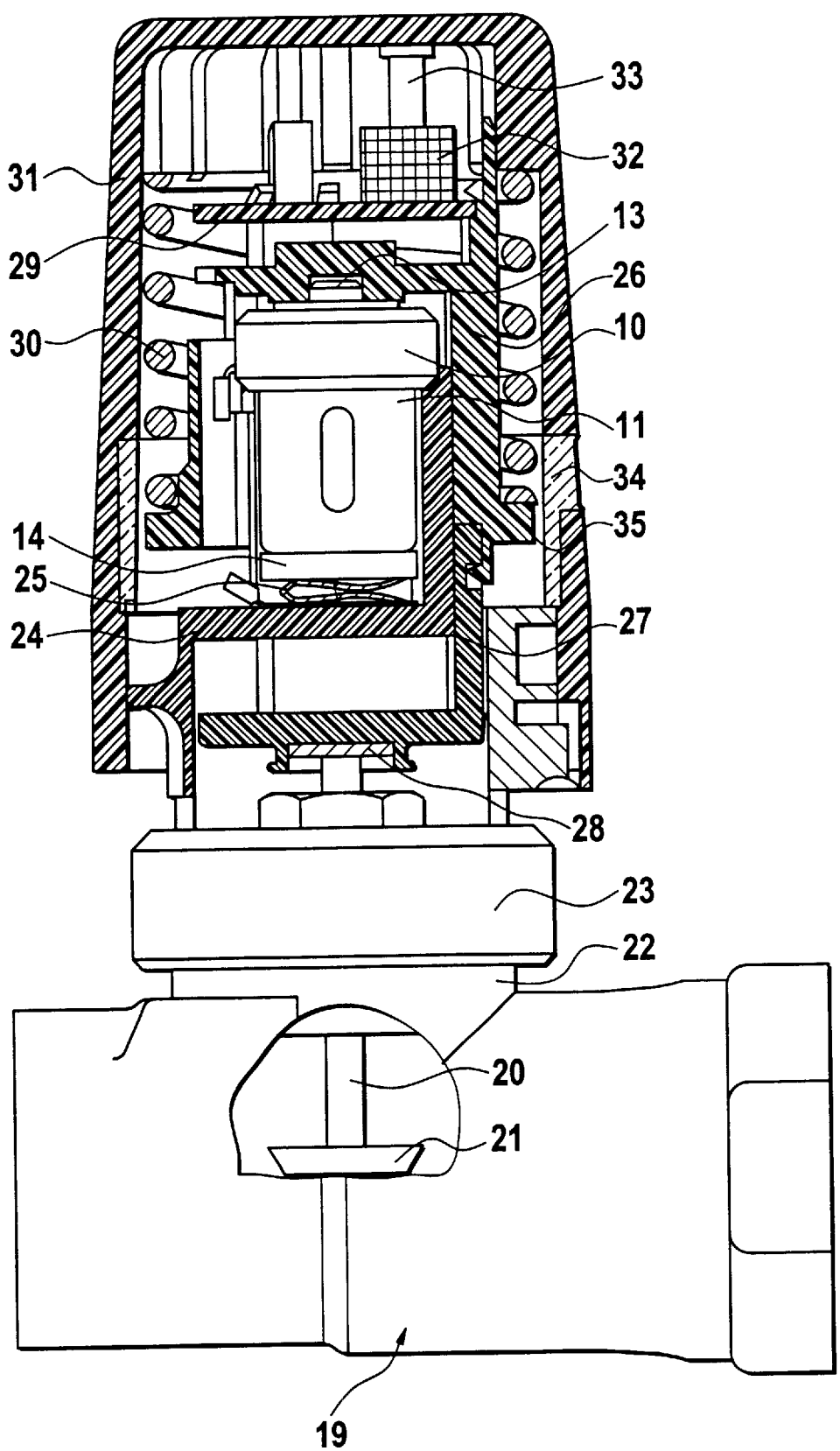
FIG. 2 is a vertical sectional view of an actuator of the preferred structural embodiment of the present invention mounted on a flow valve, with the components in the position where the thermostatic operating element is unheated.

The actuator shown in FIG. 2 corresponds generally to the actuator disclosed in U.S. Pat. No. 5,897,055 (German Patent Disclosure DE 197 05 721 A1), which is incorporated herein by reference. The actuator includes a base body member 24, which can be secured by a union nut 23 to threads of a device to be actuated, such as a valve. As shown in FIG. 2, the actuator is mounted to a connection stub 22 integral to valve 19 by the union nut 23, the actuator situated in a manner to engage and operate a valve tappet 20 which carries a valve plate 21 that is associated with a valve seat, not shown in detail, where the valve tappet 20 is biased by a compression spring 30 which opens the valve 19 when no external load is acting on the valve tappet 20. A motion transfer member, assembled from two parts 26, 27 is disposed on the base body member 24 for movement relative thereto, and the operating piston 13 of a thermostatic operating element 10 is in operable engagement therewith. The housing 11 of the thermostatic operating element 10 is supported in stationary fashion on the base body member 24 and is seated on an electrical heating element 14, such as a positive temperature coefficient resistor (PTC), which is supported on the base body member 24 This PTC resistor is connected to an electric current source in the manner disclosed in U.S. Pat. No. 5,897,055 (German Patent Disclosure DE 197 05 721 A1). The thermostatic operating element 10 is oriented such that the operating piston 13 moves in a direction away from the union nut 23 when the operating element 10 is actuated.

With this arrangement of the components, when the electrical heating element 14 is energized, it heats the operating element 10 to cause expansion of the wax mixture in the operating element 10, thereby forcing the operating piston 13 outward, which in turn moves the motion transfer member, 26, 27 against the bias of the compression spring 30, which movement results in the motion transfer member 26, 27 moving an actuating element of the device being actuated.

The compression spring 30 is supported by an annular collar 35 disposed on one part 26 of the motion transfer member 26, 27 and prestressed against an outer housing 31. The outer housing 31 encloses the thermostatic operating element 10 including the operating piston 13, heating element 14, compression spring 30, motion transfer member 26, 27 and the base body member 24. The outer housing 31 is secured to the base body member 24.

On its side toward the union nut 23, the part 27 of the motion transfer member 26, 27 penetrates the base body member 24 and includes a pressure plate 28 which forms a bearing face for the element to be actuated, in FIG. 2 a valve tappet 20. A circuit board 29 is mounted on the face end of the part 26 of the motion transfer member 26, 27 that is opposite the operating piston 13. The piston travel detection device shown in FIG. 1 includes an electromagnetic coil 32 mounted on the surface of the circuit board 29 and a ferrite bar 33 secured to the inside surface of the top of the outer housing 31. The ferrite bar 33 is positioned such that the ferrite bar 33 penetrates the electromagnetic coil 32 when the operating piston 13 moves outward, pushing the part 26 of the motion transfer member 26, 27 toward the top of the outer housing 31. The closed-loop controller and the relay are also disposed upon the circuit board 29.

A window 34 of transparent material is inserted into the outer housing 31 facing the annular collar 35 on the part 26 or the motion transfer member 26, 27 such that it is possible to view the position and functioning of the actuator external of the outer housing 31.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof

I claim:

1. An actuator having an electrically heatable thermostatic operating element which has a housing containing an expanding material and an operating piston moveable in response to heating and cooling of the operating element, an electrical heating element in direct contact with the housing, an electrical supply line connected to the electrical heating element, and a proportional piston stroke regulator comprising:

a piston travel detection device for detecting the extent of extension of the piston from said housing, a closed-loop controller connected to said piston travel detection device and the electrical supply line, the closed-loop controller directing the supply of electrical power to the electrical heating element based on a comparison between a pre-determined control piston position entered into the controller and a detected piston position as detected by the piston travel detection device, a stationary base body, securable to a device to be actuated and upon which the electrically heatable operating element is supported, a motion transfer member disposed within the actuator and extending for actuating engagement with a moveable actuator element of the device being actuated, and forming a follower for the piston, a compression spring biasing the motion transfer member in following engagement with the piston, an outer housing enclosing the operating element, the piston, the electrical heating element, the proportional piston stroke regulator including the piston travel detection device and the closed-loop controller, the motion transfer member and the compression spring, the piston travel detection device disposed between the motion transfer member and one of said outer housing and said base body, said piston travel detection device includes a stationary element, attached to one of said outer housing and said base body, and a relative position detection element attached to the motion transfer member and moveable with the piston and the motion transfer member, the relative position detection element being attached to the motion transfer member such that the relative position detection device moves relative to the stationary element when the piston and motion transfer member move, a conventional circuit board mounted on the motion transfer member, the relative position detection element of the piston travel detection device being disposed on the circuit board.

2. An actuator according to claim 1 and characterized further in that the conventional closed-loop controller is disposed on the circuit board.

3. An actuator having an electrically heatable thermostatic operating element which has a housing containing an expanding material and an operating piston moveable in response to heating and cooling of the operating element, an electrical heating element in direct contact with the housing, an electrical supply line connected to the electrical heating element, and a proportional piston stroke regulator comprising:

a piston travel detection device for detecting the extent of extension of the piston from said housing;

a closed-loop controller connected to said piston travel detection device and the electrical supply line, the closed-loop controller directing the supply of electrical power to the electrical heating element based on a comparison between a pre-determined control piston position entered into the controller and a detected piston position as detected by the piston travel detection device;

a relay integrated into the electrical supply line between said closed-loop controller and the electrical heating element, permitting the closed-loop controller to send intermittent pulses of alternating current through the electrical supply line to the electrical heating element;

a stationary base body, securable to a device to be actuated and upon which the electrically heatable operating element is supported;

a motion transfer member disposed within the actuator and extending for actuating engagement with a moveable actuator element of the device being actuated, and forming a follower for the piston;

a compression spring biasing the motion transfer member in following engagement with the piston;

an outer housing enclosing the operating element, the piston, the electrical heating element, the proportional piston stroke regulator including the piston travel detection device and the closed-loop controller, the relay, the motion transfer member and the compression spring;

the piston travel detection device disposed between the motion transfer member and one of said outer housing and said base body;

said piston travel detection device includes a stationary element, attached to one of said outer housing and said base body, and a relative position detection element attached to the motion transfer member and moveable with the piston and the motion transfer member, the relative position detection element being attached to the motion transfer member such that the relative position detection device moves relative to the stationary element when the piston and motion transfer member move; and a conventional circuit board mounted on the motion transfer member, the relative position detection element of the piston travel detection device being disposed on the circuit board.

4. An actuator according to claim 3 and characterized further in that the conventional closed-loop controller and the relay are disposed on the circuit board.

* * * * *